(12) United States Patent
Crema et al.

(10) Patent No.: US 12,291,813 B2
(45) Date of Patent: May 6, 2025

(54) COMPONENT FOR A WATER BEARING APPLIANCE AND METHOD FOR PRODUCING SUCH COMPONENT

(71) Applicant: Electrolux Appliances Aktiebolag, Stockholm (SE)

(72) Inventors: Luca Crema, Porcia (IT); Massimo Sanità, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/799,375

(22) PCT Filed: Jan. 28, 2021

(86) PCT No.: PCT/EP2021/051918
§ 371 (c)(1),
(2) Date: Aug. 12, 2022

(87) PCT Pub. No.: WO2021/165005
PCT Pub. Date: Aug. 26, 2021

(65) Prior Publication Data
US 2023/0091470 A1 Mar. 23, 2023

(30) Foreign Application Priority Data
Feb. 19, 2020 (EP) .................................. 20158353

(51) Int. Cl.
*D06F 37/26* (2006.01)
*A47L 15/42* (2006.01)
(Continued)

(52) U.S. Cl.
CPC ........ *D06F 37/263* (2013.01); *B29C 45/0001* (2013.01); *B29C 45/1642* (2013.01);
(Continued)

(58) Field of Classification Search
CPC ............... D06F 37/263; B29C 45/0001; B29C 45/1642; B29C 2045/1656; B32B 7/02;
(Continued)

(56) References Cited

U.S. PATENT DOCUMENTS 3,424,703 A   1/1969   Jones, Jr.
4,931,493 A   6/1990   Weber
(Continued)

FOREIGN PATENT DOCUMENTS

AU   2004275999 A1   4/2005
CN   101006131 A    7/2007
(Continued)

OTHER PUBLICATIONS

International Search Report and Written Opinion for International Application No. PCT/EP2021/051924, dated Apr. 23, 2021, 14 pages.
(Continued)

*Primary Examiner* — Michael C Miggins
(74) *Attorney, Agent, or Firm* — Bradley Arant Boult Cummings LLP

(57) ABSTRACT

A component for a water bearing appliance, wherein the component comprises a first polymeric material and a second polymeric material. The first polymeric material constitutes the external surface of the component and completely covers the second polymeric material. The first polymeric material and the second polymeric material have different characteristics.

18 Claims, 10 Drawing Sheets

(51) Int. Cl.

| | |
|---|---|
| B29C 45/00 | (2006.01) |
| B29C 45/16 | (2006.01) |
| B29K 25/00 | (2006.01) |
| B29K 105/26 | (2006.01) |
| B29L 9/00 | (2006.01) |
| B29L 22/00 | (2006.01) |
| B29L 31/00 | (2006.01) |
| B32B 7/02 | (2019.01) |
| B32B 27/08 | (2006.01) |
| B32B 27/30 | (2006.01) |

(52) U.S. Cl.
CPC ............... *B32B 7/02* (2013.01); *B32B 27/08* (2013.01); *A47L 15/4246* (2013.01); *B29C 2045/1656* (2013.01); *B29K 2025/06* (2013.01); *B29K 2105/26* (2013.01); *B29L 2009/00* (2013.01); *B29L 2022/00* (2013.01); *B29L 2031/762* (2013.01); *B32B 27/302* (2013.01); *B32B 2250/03* (2013.01); *B32B 2250/24* (2013.01); *B32B 2250/40* (2013.01); *B32B 2272/00* (2013.01); *B32B 2509/00* (2013.01)

(58) Field of Classification Search
CPC ... B32B 27/08; B32B 27/302; B32B 2250/03; B32B 2250/24; B32B 2250/40; B32B 2272/00; B32B 2509/00; A47L 15/4246; B29K 2025/06; B29K 2105/26
See application file for complete search history.

(56) References Cited

U.S. PATENT DOCUMENTS

| | | |
|---|---|---|
| 5,091,461 A | 2/1992 | Skochdopole |
| 5,221,136 A | 6/1993 | Hauck et al. |
| 5,236,963 A | 8/1993 | Jacoby et al. |
| 5,310,584 A | 5/1994 | Jacoby et al. |
| 5,965,655 A | 10/1999 | Mordecai et al. |
| 6,348,536 B1 | 2/2002 | Fourty et al. |
| 7,585,911 B2 | 9/2009 | Posch et al. |
| 8,007,902 B2 | 8/2011 | Smith |
| 8,083,985 B2 | 12/2011 | Luisi et al. |
| 8,188,188 B2 | 5/2012 | Kobayashi et al. |
| 8,227,541 B2 | 7/2012 | Stoll et al. |
| 9,018,310 B2 | 4/2015 | Palama |
| 9,562,153 B2 | 2/2017 | Lopez et al. |
| 10,316,194 B2 | 6/2019 | Jouffret et al. |
| 10,352,613 B2 | 7/2019 | Buzzi et al. |
| 10,513,601 B2 | 12/2019 | Chen et al. |
| 10,532,544 B2 | 1/2020 | Short |
| 10,920,054 B2 | 2/2021 | Santà et al. |
| 10,962,277 B2 | 3/2021 | De Luca et al. |
| 11,067,204 B2 | 7/2021 | Papillon et al. |
| 11,104,778 B2 | 8/2021 | Mas et al. |
| 2005/0228136 A1 | 10/2005 | Ko et al. |
| 2006/0249216 A1 | 11/2006 | Sexton et al. |
| 2007/0096364 A1 | 5/2007 | Hahn et al. |
| 2007/0278717 A1 | 12/2007 | Novak et al. |
| 2008/0319136 A1 | 12/2008 | Oshima et al. |
| 2011/0274900 A1 | 11/2011 | Megally et al. |
| 2012/0187132 A1 | 7/2012 | Ersoy et al. |
| 2014/0272214 A1 | 9/2014 | Ellis et al. |
| 2015/0209988 A1 | 7/2015 | Swenson |
| 2016/0107350 A1 | 4/2016 | Swenson |
| 2016/0169575 A1 | 6/2016 | Yu et al. |
| 2017/0097186 A1 | 4/2017 | Park et al. |
| 2018/0313600 A1 | 11/2018 | De Luca et al. |
| 2019/0390893 A1 | 12/2019 | Csapos et al. |

FOREIGN PATENT DOCUMENTS

| | | |
|---|---|---|
| CN | 101291965 A | 10/2008 |
| CN | 102046704 A | 5/2011 |
| DE | 4033298 A1 | 5/1991 |
| EP | 0589033 A1 | 3/1994 |
| EP | 0605914 A1 | 7/1994 |
| EP | 0755729 A1 | 1/1997 |
| EP | 1685786 A1 | 8/2006 |
| EP | 1787790 A1 | 5/2007 |
| EP | 1825984 A2 | 8/2007 |
| EP | 2392718 A1 | 12/2011 |
| EP | 2537804 A1 | 12/2012 |
| EP | 3260594 A1 | 12/2017 |
| EP | 3096932 B1 | 12/2018 |
| FR | 1411841 A | 9/1965 |
| JP | 08207193 A | 8/1996 |
| JP | 2001225353 A | 8/2001 |
| JP | 2009190773 A | 8/2009 |
| JP | 6585366 B2 | 10/2019 |
| MX | 2014008464 A | 1/2016 |
| WO | 03087215 A1 | 10/2003 |
| WO | 2014152014 A1 | 9/2014 |

OTHER PUBLICATIONS

International Search Report and Written Opinion for International Application No. PCT/EP2021052353, dated Jun. 1, 2021, 9 pages.
Moldflow Insight 2017 Help: Co-Injection Molding Overview (Concept), Moldflow Insight, 2017, retrieved from the Internet at: http://help.autodesk.com/view/MFIA/2017/ENU/?guid=GUID-2B0368FE-6627-48C3-BFE-6EA69B8812C2, 2017, 2 pages.
Wager et al., "RoHS Regulated Substances in Mixed Plastics from Waste Electrical and Electronic Equipment", Environmental Science & Technology, 2010, pp. 628-635.
International Search Report and Written Opinion for International Application No. PCT/EP2021/051919, dated Apr. 23, 2021, 12 pages.
International Search Report and Written Opinion for International Application No. PCT/EP2021/051918, dated Apr. 23, 2021, 11 pages.
Jacoby, "Nucleating Agents in Polypropylene: Selection for Optimum Performance and Processability", Special Chem, 2015, 4 pages.
Brazilian Search Report and Written Opinion for International Application No. BR112019022864-0, dated Nov. 24, 2021, 4 pages.
"Honda Develops Bumper-To-Bumper Recycling Technology" Automotive Engineering, Society of Automotive Engineering, 1996, vol. 104, No. 6, pp. 77-79.
International Search Report and Written Opinion for International Application No. PCT/EP2017/062269, dated Feb. 9, 2018, 9 pages.
Non Final Office Action for U.S. Appl. No. 16/614,463, mailed Oct. 14, 2022, 22 pages.
Examination Report dated Nov. 28, 2024 of corresponding European Patent Application No. 20 158 353.1.
Brazilian Patent and Trademark Office; Brazilian Patent Application No. BR112022016380-0; Search Report and Written Opinion, Aug. 22, 2024, 4 pages.

COMPONENT FOR A WATER BEARING APPLIANCE AND METHOD FOR PRODUCING SUCH COMPONENT

This application is a U.S. National Phase application of PCT International Application No. PCT/EP2021/051918, filed Jan. 28, 2021, which claims the benefit of EP 20158353.1, filed Feb. 19, 2020, both of which are incorporated by reference herein.

The present invention concerns the production of components for water bearing appliances, in particular components for laundry or dish washing machines or driers.

Specifically, the invention relates to a component made of polymeric material for washing machines, in particular laundry or dish washing machines.

More particularly, the invention relates to a washing tub made of polymeric material for laundry or dish washing machines.

BACKGROUND ART

Nowadays the use of plastic components in water bearing appliances such as laundry washing machines or laundry washing-drying machines or driers or dish washing machines, is widespread.

Components made of plastic typically comprise washing tubs, machine base, frames, external casings of the machines or part thereof, like for example a user control panel, a filter door, a door frame, etc.

Known plastic components are typically produced through injection moulding wherein molten plastic material is forced into a mould cavity to realize a solid material component, preferably a thermoplastic solid material component.

Mechanics and aesthetics characteristics are therefore determined by the type of plastic material used in the moulding process.

It is an object of the invention to optimize mechanics and/or aesthetics characteristics of plastic components for water bearing appliances on the base of the type of plastic material used in the producing process.

It is another object of the invention to implement a water bearing appliance component which has reduced production cost compared to known water bearing appliance components.

It is a further object of the invention to implement a water bearing appliance that reduces the environmental impact in terms of plastic materials used for its production.

DISCLOSURE OF INVENTION

Applicant has found that by providing a component for a water bearing appliance comprising two polymeric materials wherein the first polymeric material completely covers the second polymeric material, it is possible to reach the mentioned objects.

In a first aspect thereof the present invention relates, therefore, to a component for a water bearing appliance, wherein the component comprises a first polymeric material and a second polymeric material, said first polymeric material constituting the external surface of said component and completely covering said second polymeric material, wherein said first polymeric material and said second polymeric material have different characteristics.

Preferably, the first polymeric material and/or the second polymeric material comprises polymers.

In a preferred embodiment of the invention, the first polymeric material and/or the second polymeric material comprises a thermoplastic material.

According to preferred embodiments of the invention, the first polymeric material and the second polymeric material are different in terms of degree of purity and/or mechanical strength and/or chemical composition characteristics.

Preferably, the first polymeric material comprises not recycled polymeric material.

Preferably, the second polymeric material comprises recycled polymeric material.

Advantageously, the component of the invention may be manufactured with a lower cost compared to known system thanks to the use of a recycled material.

Advantageously, the external layer of the component of the invention may be realized with a suitable first polymeric material that may be selected so as to give a better aesthetic appearance than that of the recycled material used for the component core.

Still advantageously, the use of recycled materials to produce the component reduces the environmental impact in terms of plastic materials consumption and in terms of re-use/recycling of waste plastic materials.

In a preferred embodiment of the invention, the recycled material derives from post-consumer plastic and/or post-industrial plastic materials.

In a preferred embodiment of the invention, said recycled material comprises a polymeric material comprising one or more chemical elements of the group comprising the following chemical elements: Lead; Cadmium; Mercury; Hexavalent Chromium; Bromine; Antimony; Arsenic; wherein said one or more chemical elements can be found in a quantity inside said recycled material above, or equal to, a minimum threshold.

Preferably, said minimum threshold for Lead is 7 ppm and/or said minimum threshold for Cadmium is 5 ppm and/or said minimum threshold for Mercury is 0.01 ppm and/or said minimum threshold for Hexavalent Chromium is 10 ppm and/or said minimum threshold for Bromine is 5 ppm and/or said minimum threshold for Antimony is 5 ppm and/or said minimum threshold for Arsenic is 5 ppm.

In a preferred embodiment of the invention, said one or more chemical elements can be found in a quantity inside said recycled material below, or equal to, a maximum threshold.

When the recycled material derives from polyolefin polymers, said maximum threshold for Lead is 60 ppm and/or said maximum threshold for Cadmium is 20 ppm and/or said maximum threshold for Mercury is 0.5 ppm and/or said maximum threshold for Hexavalent Chromium is 20 ppm and/or said maximum threshold for Bromine is 60 ppm and/or said maximum threshold for Antimony is 50 ppm and/or said maximum threshold for Arsenic is 50 ppm.

When the recycled material derives from Styrenic polymers, said maximum threshold for Lead is 90 ppm and/or said maximum threshold for Cadmium is 40 ppm and/or said maximum threshold for Mercury is 10 ppm and/or said maximum threshold for Hexavalent Chromium is 100 ppm and/or said maximum threshold for Bromine is 100 ppm and/or said maximum threshold for Antimony is 200 ppm and/or said maximum threshold for Arsenic is 200 ppm.

Advantageously, impurity chemical elements falling within these maximum thresholds guarantee a good standard in term of mechanical properties (stiffness, strength, etc) to the component.

Advantageously, the first polymeric material and the second polymeric material form a one-piece monolithic body.

In a preferred embodiment of the invention, the first polymeric material and the second polymeric material are co-injected material resulting from co-injection moulding process.

Co-injection moulding process is a polymer injection technology in which different polymers are injected, one after the other, into the same mould.

Advantageously, co-injection moulding process provides a cost-effective solution when two materials needs to be linked one to the other.

Preferably, said component is one of: a tub of said water bearing appliance, a casing component of said water bearing appliance, a control panel of said water bearing appliance.

In a preferred embodiment of the invention, the component of the invention is a tub of the laundry washing machine, said tub comprising a front hemi-shell and a rear hemi-shell, wherein the external surface of the front hemi-shell and/or of the rear hemi-shell is completely covered by the second polymeric material.

According to the invention, the water bearing appliance is preferably a water bearing household appliance, more preferably a laundry washing machine or a laundry washing-drying machine or a drier or a dish washing machine.

In a further aspect thereof, the present invention concerns a method for producing a component as described above, wherein the method comprises the steps of:
  injecting from at least one injection point said first polymeric material into a cavity of a mould for a first time so that said first polymeric material reaches internal surfaces of said mould and at least partially solidifies to form an external solidified layer;
  injecting from said at least one injection point, after said first time, said second polymeric material into said mould for a second time so that said second polymeric material fills the core of said cavity and pushes the first polymeric material not yet solidified so that said first polymeric material reaches all remaining internal surfaces of said mould where at least partially solidifies and forms an external solidified layer.

Said method carries out a co-injection moulding process wherein the first polymeric material and the second polymeric material are injected, one after the other, into the same mould.

BRIEF DESCRIPTION OF THE DRAWINGS

Further characteristics and advantages of the present invention will be highlighted in greater detail in the following detailed description of a preferred embodiment, provided with reference to the enclosed drawings. In the drawings, corresponding characteristics and/or components are identified by the same reference numbers. In particular.

DETAILED DESCRIPTION OF A PREFERRED EMBODIMENT OF THE INVENTION

The present invention has proved to be particularly advantageous to produce a washing tub in washing machines, preferably laundry washing machines, as described below. It should in any case be underlined that the present invention is not limited to laundry washing machines. On the contrary, the present invention can be conveniently applied to any plastic component for water bearing appliances such as laundry washing machines or laundry washing-drying machines or driers or dish washing machines.

Figure 1:
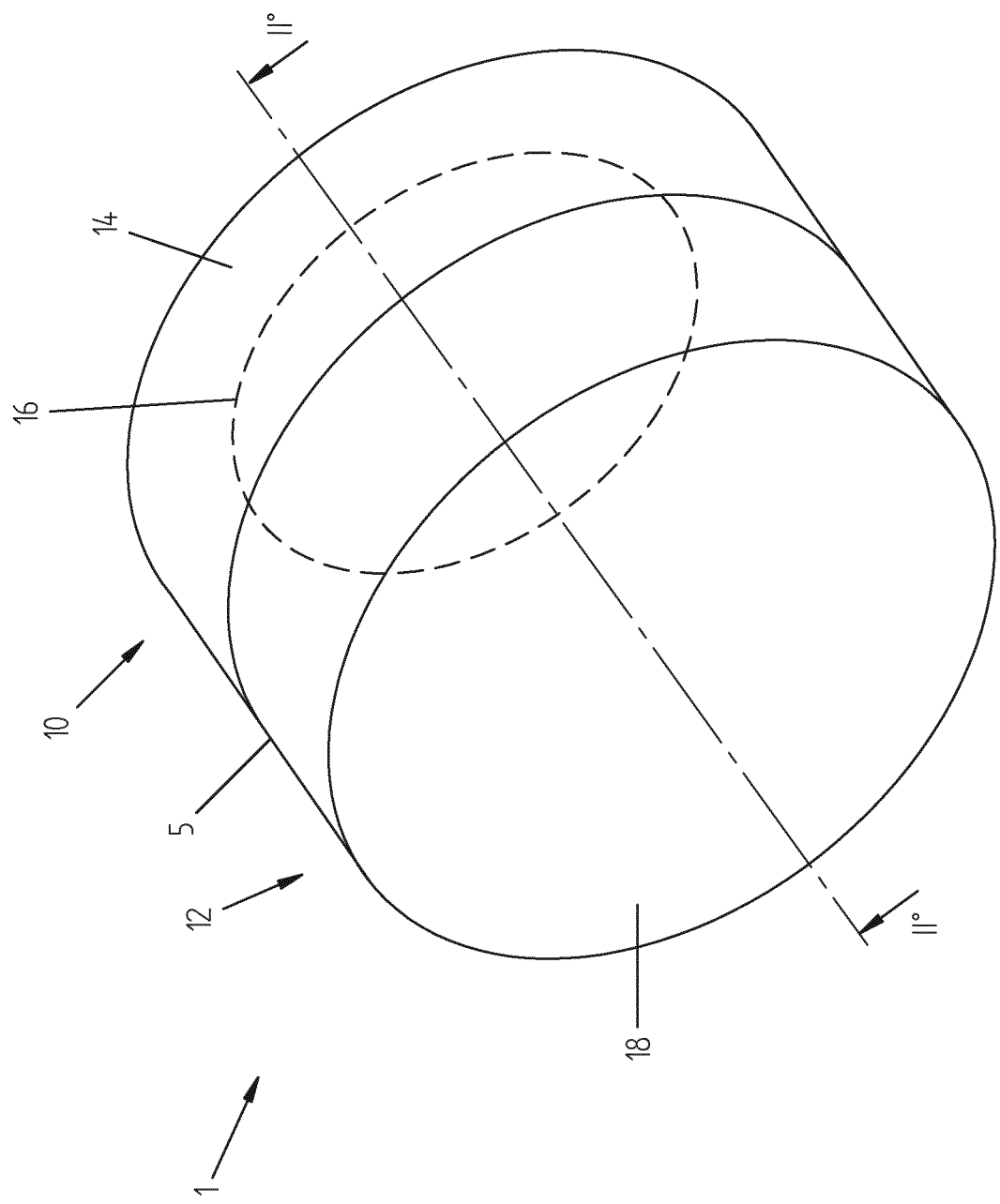
FIG. 1 shows a perspective view of a component according to a preferred embodiment of the invention.
Figure 2:
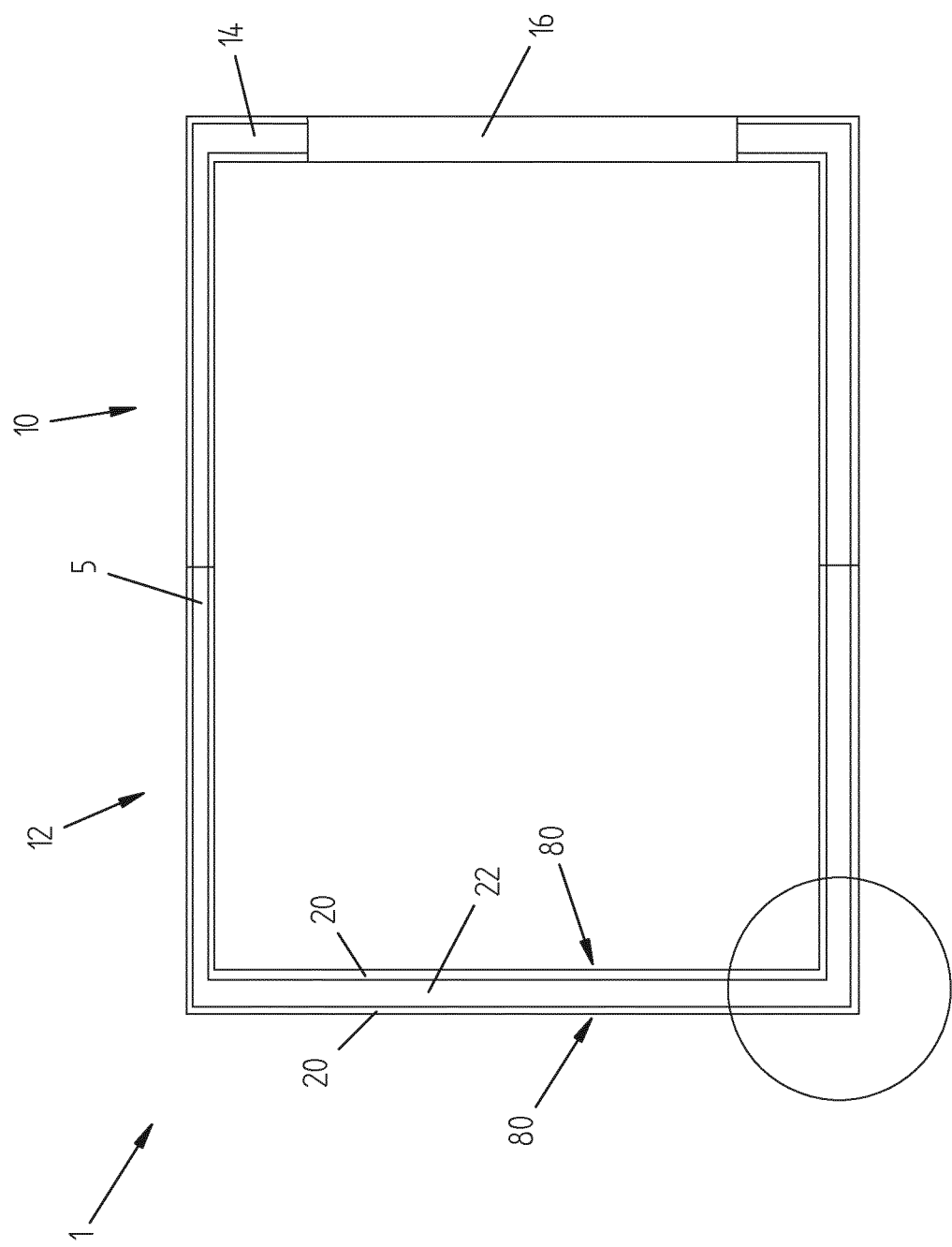
FIG. 2 is a cross section along line II°-II° of FIG. 1.

With reference to FIG. 1 a preferred embodiment of a component 1 according to the invention is shown. The component 1 is preferably a washing tub 1.

The washing tub 1 according to the invention preferably refers to a washing tub 1 of a laundry washing machine that encloses a rotatable washing drum (not shown) wherein laundry can be loaded to be submitted to a washing process.

The washing tub 1 preferably has a substantially cylindrical-shaped tubular body 5.

The washing tub 1 preferably comprises a first hemi-shell 10, or front hemi-shell 10, and a second hemi-shell 12, or rear hemi-shell 12, structured for being reciprocally coupled to form the washing tub 1.

The front hemi-shell 10 of the washing tub 1 preferably comprises a front wall 14 provided with a front mouth 16.

The rear hemi-shell 12 of the washing tub 1 preferably comprises a rear wall 18.

Figure 3:
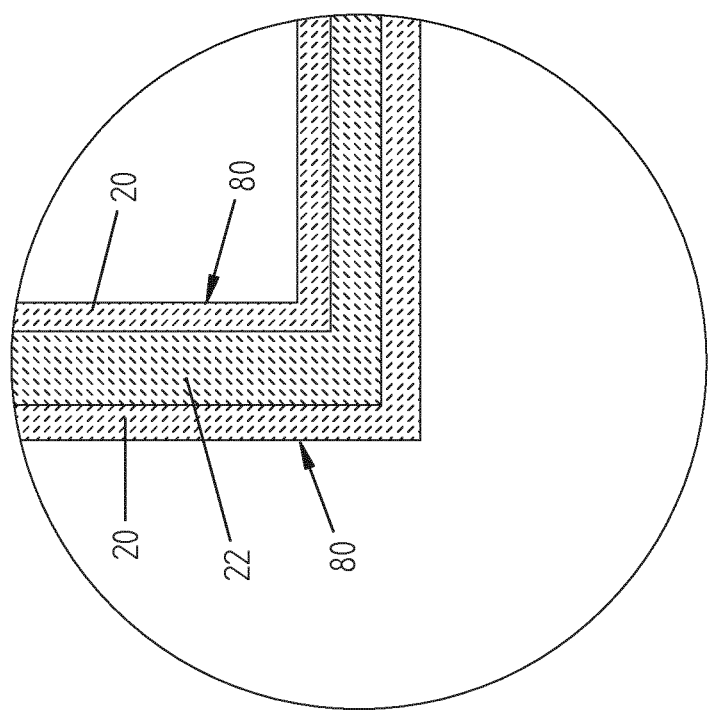
FIG. 3 is an enlarged view of a detail of FIG. 2.

According to an aspect of the invention, the washing tub 1 preferably comprises a first polymeric material 20 and a second polymeric material 22, as better illustrated in FIG. 3.

The first polymeric material 20 constitutes the external surface 80 of the component 1 and completely covers the second polymeric material 22.

The second polymeric material 22 constitutes the core of the component 1 and is completely surrounded by the first polymeric material 20.

It has to be noted that the component 1 may be provided with recesses or holes so that the second polymeric material 22 of the core of the component 1 may be locally not covered by the first polymeric material 20 of the external surface 80, thus exposing the core of the component 1 to the external ambient. Preferably, nevertheless, recesses or holes are subsequently covered by the assembly of additional components, such as screws, brackets, etc.

The component 1 is preferably obtained through a continuous injection moulding process, or co-injection moulding process, wherein the first polymeric material 20 and the second polymeric material 22 are sequentially and continuously injected in a mould, as better described later. The first polymeric material 20 and the second polymeric material 22 form therefore a one-piece monolithic body.

Co-injection moulding process advantageously provides a cost-effective solution when two materials needs to be linked one to the other.

In a preferred embodiment of the invention, the first and/or the second polymeric material 20, 22 comprises polymers. Preferably, the first and/or the second polymeric material comprises a thermoplastic material.

According to an aspect of the invention, the first polymeric material 20 and the second polymeric material 22 are preferably chosen to have different characteristics.

In a preferred advantageous embodiment, the first polymeric material 20 and the second polymeric material 22 are chosen to have different degrees of purity.

Preferably, the first polymeric material 20 comprises a not recycled polymeric material and the second polymeric material 22 comprises a recycled polymeric material.

By the term "recycled material" it is meant that the material composing the recycled material has a lower degree of purity than that of a not recycled material.

Said recycled polymeric material preferably comprises a material deriving from post-consumer plastic and/or post-industrial plastic materials.

By the term "post-consumer plastic materials" it is meant the selected materials deriving from the separate collection of wastes, especially municipal solid wastes, preferably from packaging.

Another possible definition indicates that the "post-consumer plastic materials" are those materials which the consumer has stopped using and which may be solid, thrown away, or discharged as waste (The global Development Research Centre. Solid waste management. Glossary, http://glossaiy.eea.euipa.eu), such as waste electrical and electronic equipment (WEEE) and waste from automotive industries.

By the term "post-industrial plastic" materials it is meant that such components are represented by industrial scraps and, i.e., by residues and/or scraps coming from or resulting from industrial processing of virgin plastic materials.

In a preferred embodiment, the recycled material deriving from plastic materials may be considered a polymeric material comprising one or more impurity chemical elements.

Preferably, the recycled material may be considered a polymeric material comprising one or more chemical elements of the group comprising the following chemical elements: Lead (Pb); Cadmium (Cd); Mercury (Hg); Hexavalent Chromium (Cr(VI)); Bromine (Br); Antimony (Sb); Arsenic (As); wherein said one or more elements can be found in a quantity inside the recycled material above a minimum threshold.

Preferably, each impurity chemical element can be found inside the recycled material in a minimum quantity as listed below:

Lead (Pb) ≥7 ppm;
Cadmium (Cd) ≥5 ppm;
Mercury (Hg) ≥0.01 ppm;
Hexavalent Chromium (Cr(VI)) ≥10 ppm;
Bromine (Br) ≥5 ppm;
Antimony (Sb) ≥5 ppm;
Arsenic (As) ≥5 ppm.

Furthermore, preferably, each impurity chemical element can be found inside the recycled material in a quantity below a maximum threshold. Therefore, preferably, each impurity chemical element can be found inside the recycled material in a quantity which is inside a preferred range.

In preferred embodiments, the recycled material may derive from polyolefin polymers, for example Polypropylene (PP) or Polyethylene (PE), or from Styrenic polymers, for example Polystyrene (PS) or Acrylonitrile-Butadiene-styrene (ABS).

When the recycled material derives from polyolefin polymers, for example, the recycled material may be considered a polymeric material comprising one or more impurity chemical elements which can be found inside the recycled material in a quantity according to table 1 below.

TABLE 1

| Chemical element | Broad Range (ppm) | Intermediate Range (ppm) | Strict Range (ppm) |
|---|---|---|---|
| Lead (Pb) | 7-1000 | 7-90 | 7-60 |
| Cadmium (Cd) | 5-100 | 5-40 | 5-20 |
| Mercury (Hg) | 0.01-1000 | 0.01-10 | 0.01-0.5 |
| Hexavalent Chromium Cr (VI) | 10-1000 | 10-100 | 10-20 |
| Bromine (Br) | 5-400 | 5-100 | 5-60 |
| Antimony (Sb) | 5-200 | 5-100 | 5-50 |
| Arsenic (As) | 5-1000 | 5-100 | 5-50 |

In a preferred embodiment and according to the Table 1 above, each impurity chemical element can be found inside the recycled material in a quantity below a maximum threshold as listed below:

Lead (Pb) ≤60 ppm;
Cadmium (Cd) ≤20 ppm;
Mercury (Hg) ≤0.5 ppm;
Hexavalent Chromium (Cr(VI)) ≤20 ppm;
Bromine (Br) ≤60 ppm;
Antimony (Sb) ≤50 ppm;
Arsenic (As) ≤50 ppm.

Preferably, impurity chemical elements falling within these maximum thresholds guarantee a good standard in term of mechanical properties (stiffness, strength, etc.) to the component.

When the recycled material derives from styrenic polymers, for example, the recycled material may be considered a polymeric material comprising one or more impurity chemical elements which can be found inside the recycled material in a quantity according to table 2.

TABLE 2

| Chemical element | Broad Range (ppm) | Intermediate Range (ppm) | Strict Range (ppm) |
|---|---|---|---|
| Lead (Pb) | 7-1000 | 7-100 | 7-90 |
| Cadmium (Cd) | 5-100 | 5-50 | 5-40 |
| Mercury (Hg) | 0.01-1000 | 0.01-10 | 0.01-0.5 |
| Hexavalent Chromium Cr (VI) | 10-1000 | 10-200 | 10-100 |
| Bromine (Br) | 5-400 | 5-200 | 5-100 |
| Antimony (Sb) | 5-700 | 5-300 | 5-200 |
| Arsenic (As) | 5-1000 | 5-800 | 5-500 |

In a preferred embodiment and according to the Table 2 above, each impurity chemical element can be found inside the recycled material in a quantity below a maximum threshold as listed below:

Lead (Pb) ≤90 ppm;
Cadmium (Cd) ≤40 ppm;
Mercury (Hg) ≤0.5 ppm;
Hexavalent Chromium (Cr(VI)) ≤100 ppm;
Bromine (Br) ≤100 ppm;
Antimony (Sb) ≤200 ppm;
Arsenic (As) ≤200 ppm.

Preferably, impurity chemical elements falling within these maximum thresholds guarantee a good standard in term of mechanical properties (stiffness, strength, etc.) to the component.

In a first advantageous aspect of the invention, the component 1 may be manufactured with a lower cost compared to known system thanks to the use of a recycled material.

In a further advantageous aspect of the invention, the external layer of component 1 is realized with a suitable first polymeric material 20 that may be selected so as to give a better aesthetic appearance than that of the recycled material used for the component core.

In a further advantageous aspect of the invention, the use of recycled materials to produce the component reduces the environmental impact in terms of plastic materials consumption and in terms of re-use/recycling of waste plastic materials.

With reference to FIGS. 4 to 7 a method to obtain a rear hemi-shell 12 according to a preferred embodiment of the invention is described.

Preferably, a moulding injection process is used to obtain the rear hemi-shell 12, or co-injection moulding process.

Figure 4:
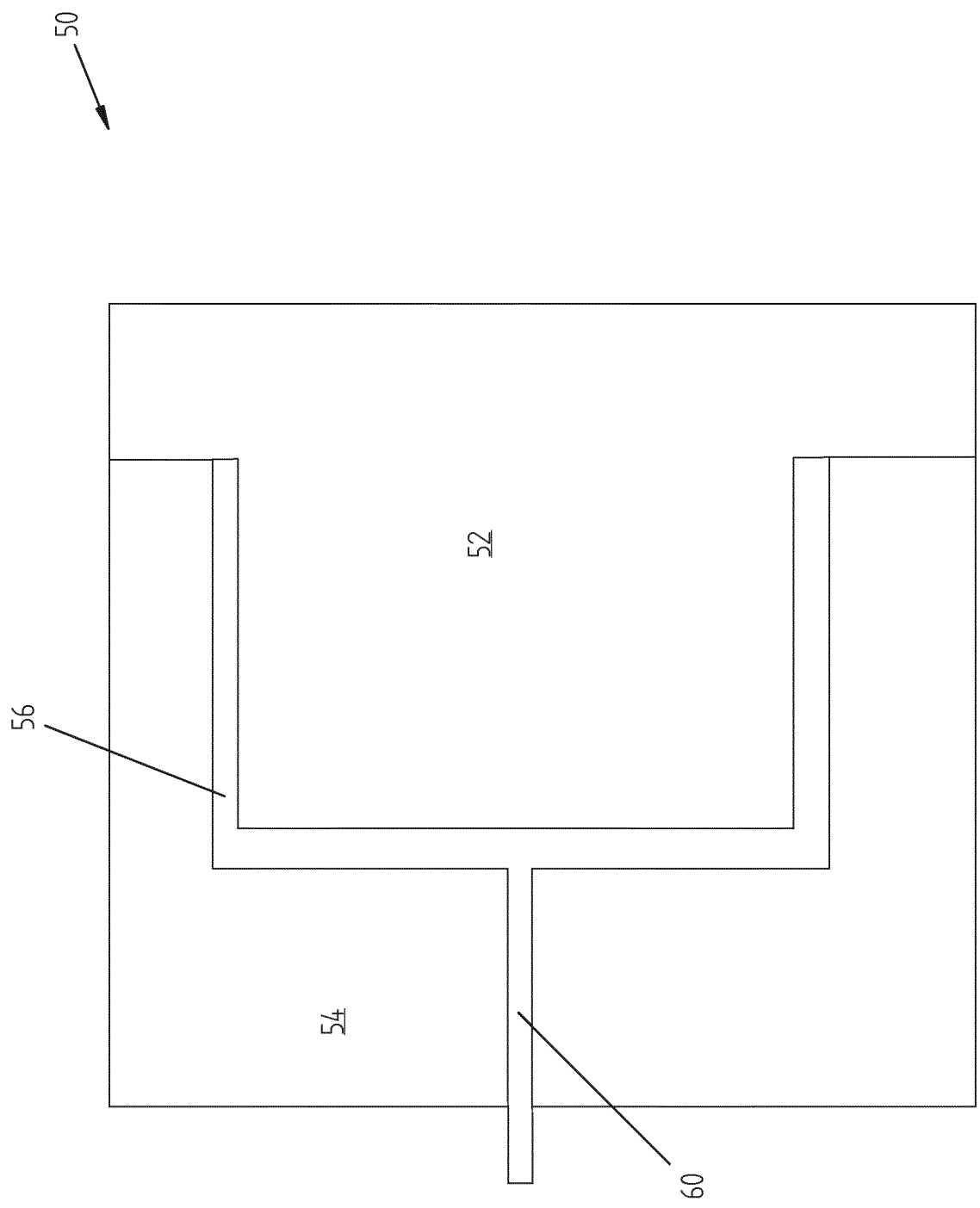
FIG. 4 shows a mould used to produce a component according to the invention.

FIG. 4 schematically shows a mould 50 used in a moulding injection process to obtain the rear hemi-shell 12 of the washing tub 1.

In a similar way, a proper mould (not shown) is used in a moulding injection process to obtain the front hemi-shell 10 of the washing tub 1.

The mould 50 preferably comprises two sides 52, 54 defining a cavity 56 with the desired shape of the rear hemi-shell 12. The mould 50 comprises at least one injection point/channel 60 through which molten polymeric material is forced into the mould cavity 56.

In different preferred embodiments, the mould may comprise a plurality of injection points/channels through which molten polymeric material is forced into the mould cavity.

For example, the mould may comprise four injection points/channels through which molten polymeric material is forced into the mould cavity. The four injection points/channels are preferably opportunely arranged to allow the more uniform distribution of the molten polymeric material inside the mould.

Figure 5:
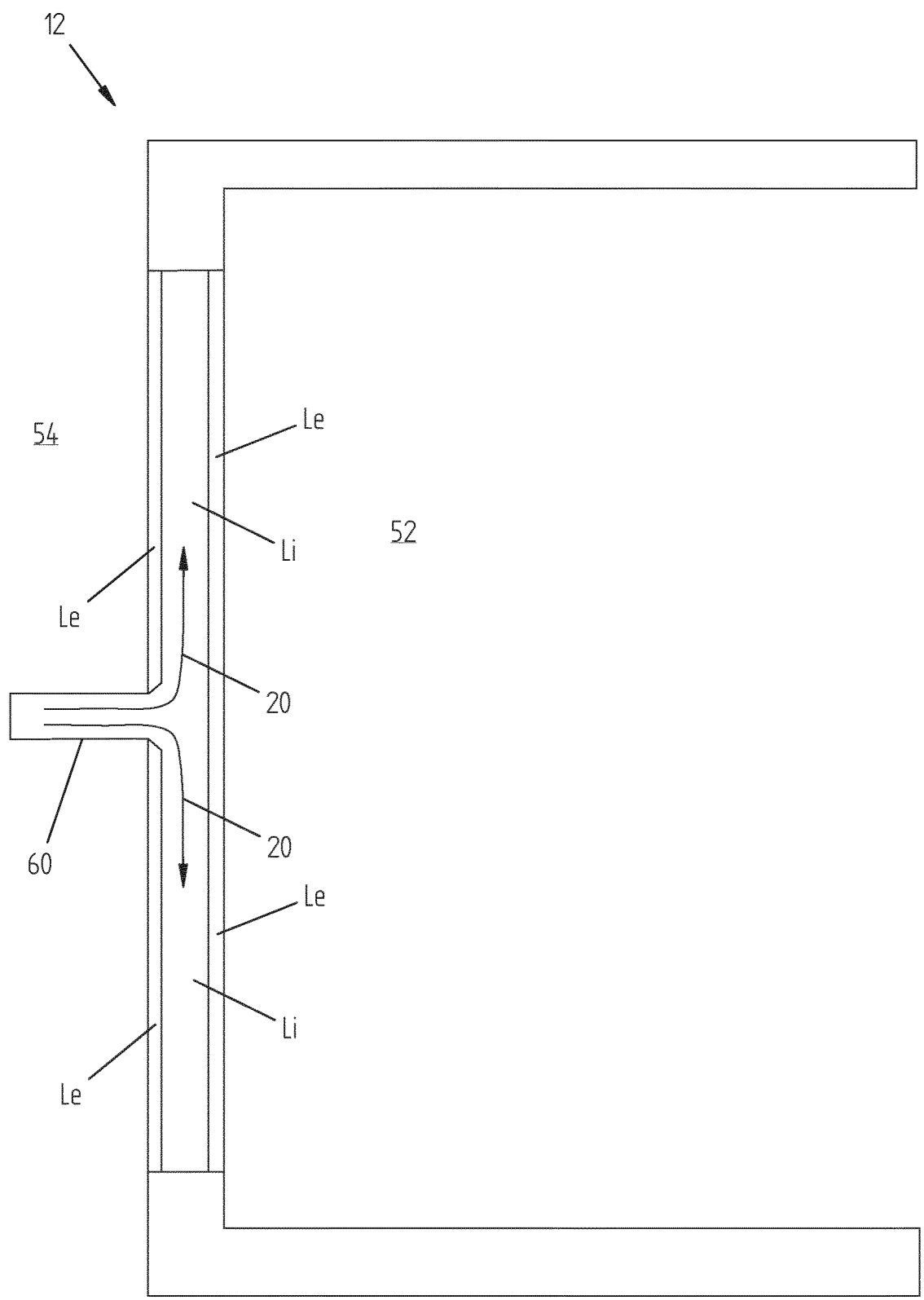
FIG. 5 shows a first phase for producing a component using the mould of FIG. 4 according to the invention.

FIG. 5 shows a first phase of the injection process.

A first molten polymeric material 20, preferably a not recycled polymeric material, is forced into the mould cavity 56 via the injection point/channel 60.

The first polymeric material 20 injected into the cavity 56 that touches the internal surfaces (walls) of the mould 50 cools rapidly and at least partially solidifies due to the low wall temperature of the mould 50. At this stage, as illustrated in FIG. 5, an external layer Le of first solidified polymeric material 20 encloses a molten core Li of first polymeric material 20.

The first polymeric material 20 is injected into the cavity 56 for a first time T1.

Figure 6:
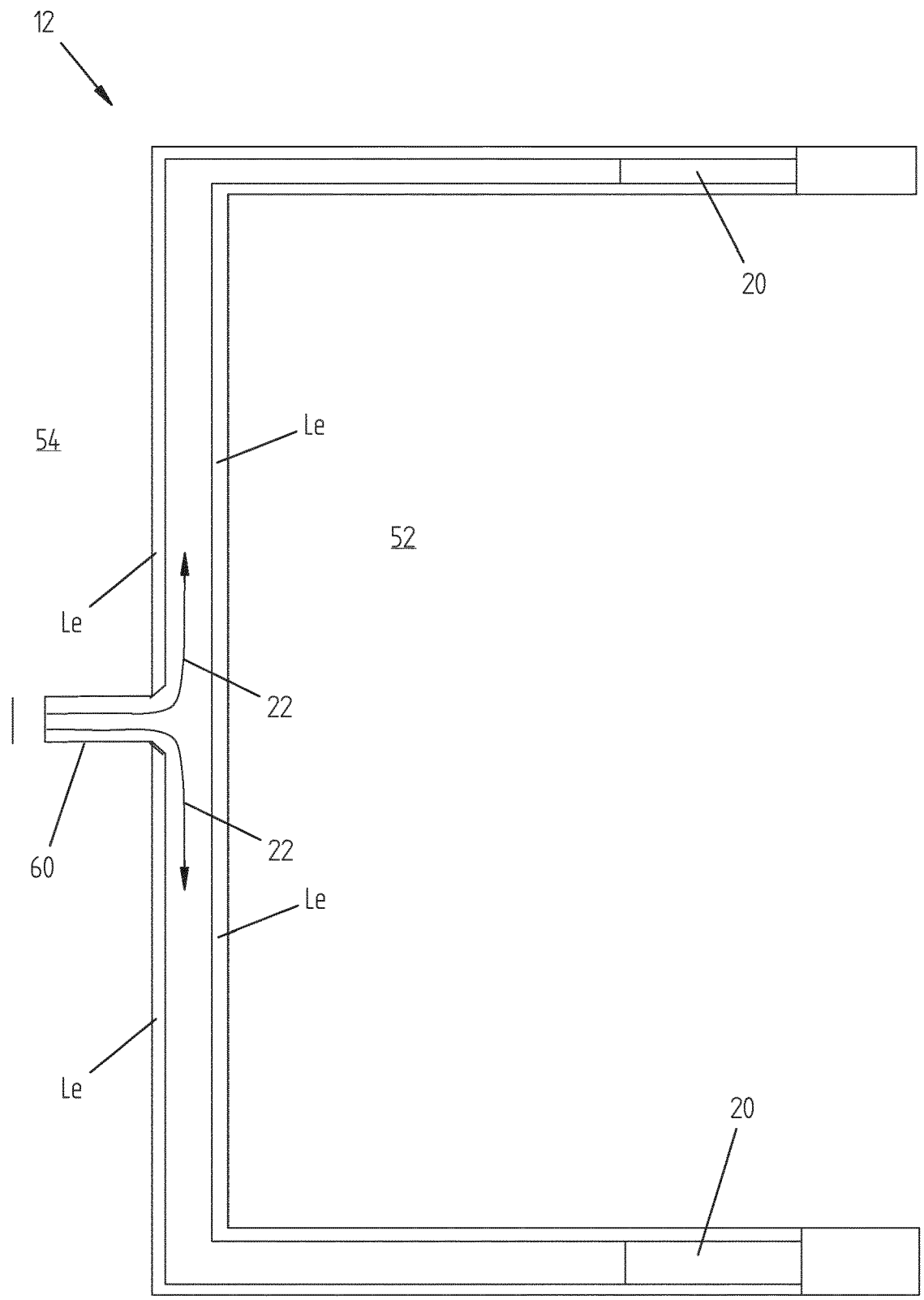
FIG. 6 shows a second phase for producing a component using the mould of FIG. 4 according to the invention.

From the end of the first time T1 the second molten polymeric material 22, preferably a recycled polymeric material, is subsequentially and continuously forced into the mould cavity 56 via the injection point/channel 60, as illustrated in FIG. 6.

The second polymeric material 22 injected into the cavity 56 fills the core of the cavity 56 and pushes the molten core Li of the first polymeric material 20 that reaches all remaining internal surfaces of the mould 50 where at least partially solidifies.

Figure 7:
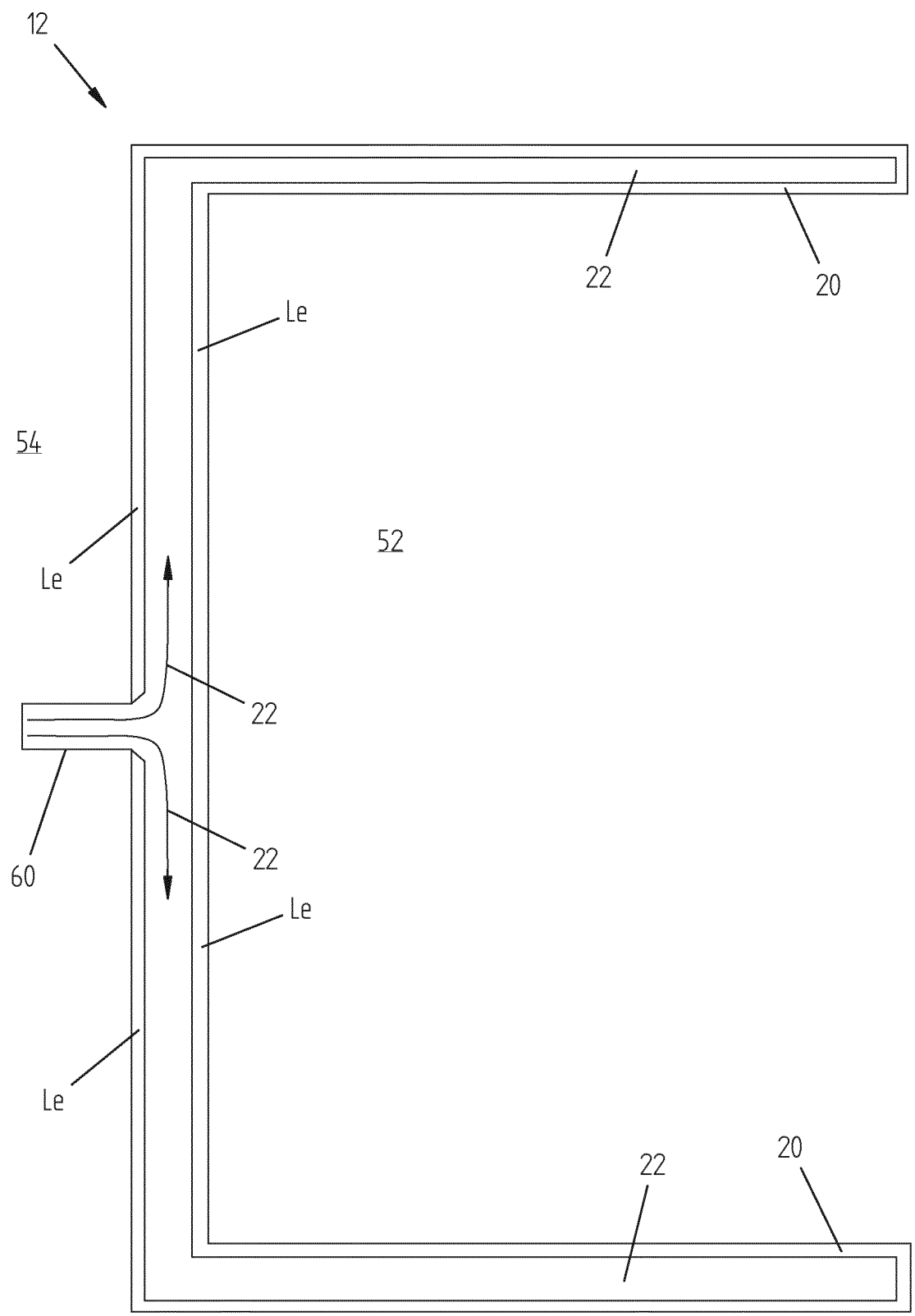
FIG. 7 shows a final phase for producing a component using the mould of FIG. 4 according to the invention.

The second polymeric material 22 is injected into the cavity 56 for a second time T2. At the end of the second time T2, the second molten polymeric material 22 fills completely the core of the rear hemi-shell 12 and is completely surrounded by the first polymeric material 20, as illustrated in FIG. 7. The first polymeric material 20, in turn, reaches all the remaining internal surfaces of the mould 50 and completely covers the second polymeric material 22.

At the end of the second time T2, the injection of material into the cavity 56 is stopped. The first polymeric material 20 and the second polymeric material 22 then completely solidified, preferably through heating of the mould 50, and the mould 50 may be finally opened and the final product 12 extracted therefrom.

It has to be noted that in the figures the first polymeric material and the second polymeric material are shown as clear separate layers. It is clear that the first polymeric material and the second polymeric material preferably partially penetrate each other for a small section so as to form a one-piece monolithic body.

The method above described to obtain a component according to the invention, for example a washing tub, eventually carries out a co-injection moulding process wherein the first polymeric material and the second polymeric material are injected, one after the other, into the same mould.

Figure 8:
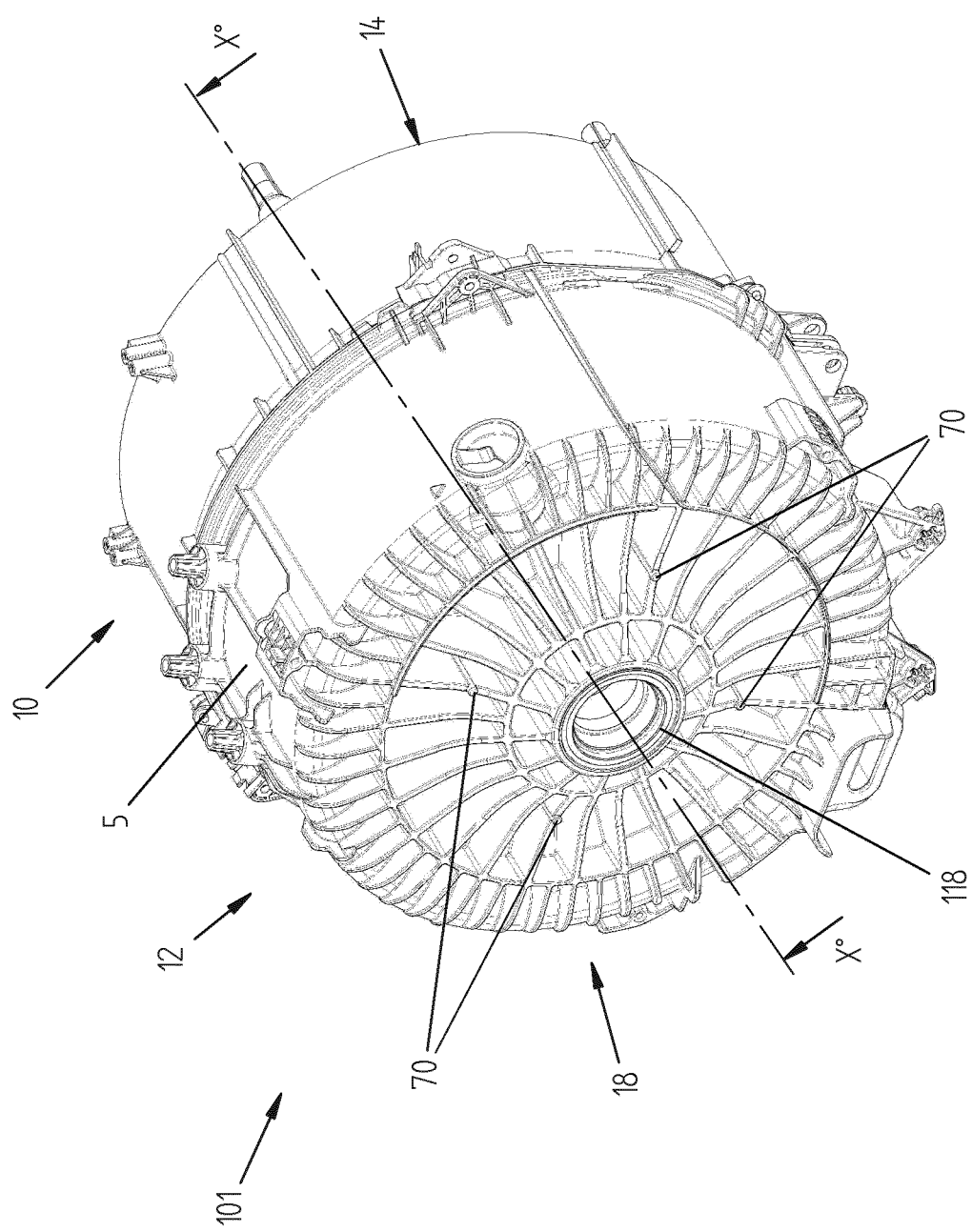
FIG. 8 shows a further embodiment of the component of FIG. 1.
Figure 9:
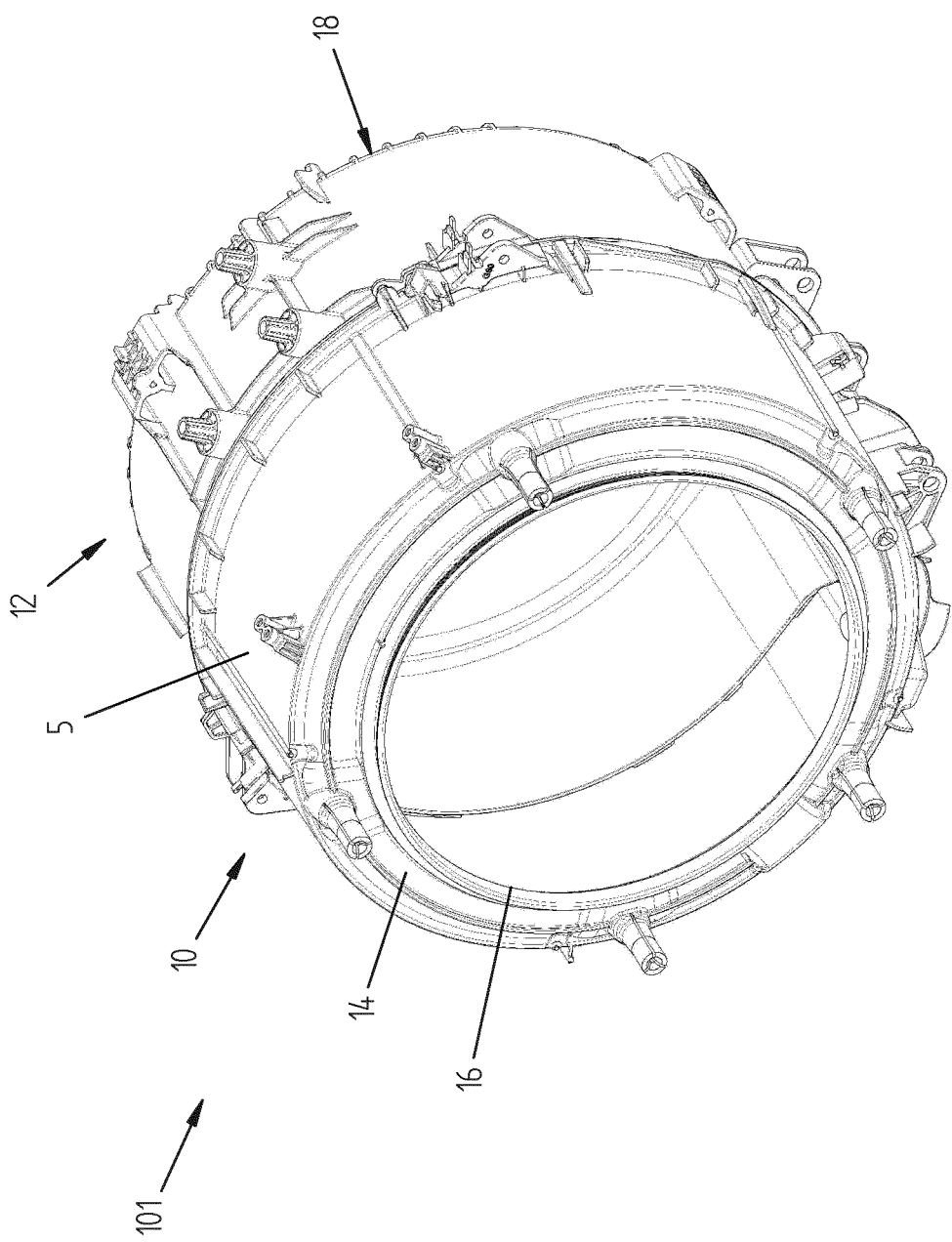
FIG. 9 the component of FIG. 8 from another point of view.
Figure 10:
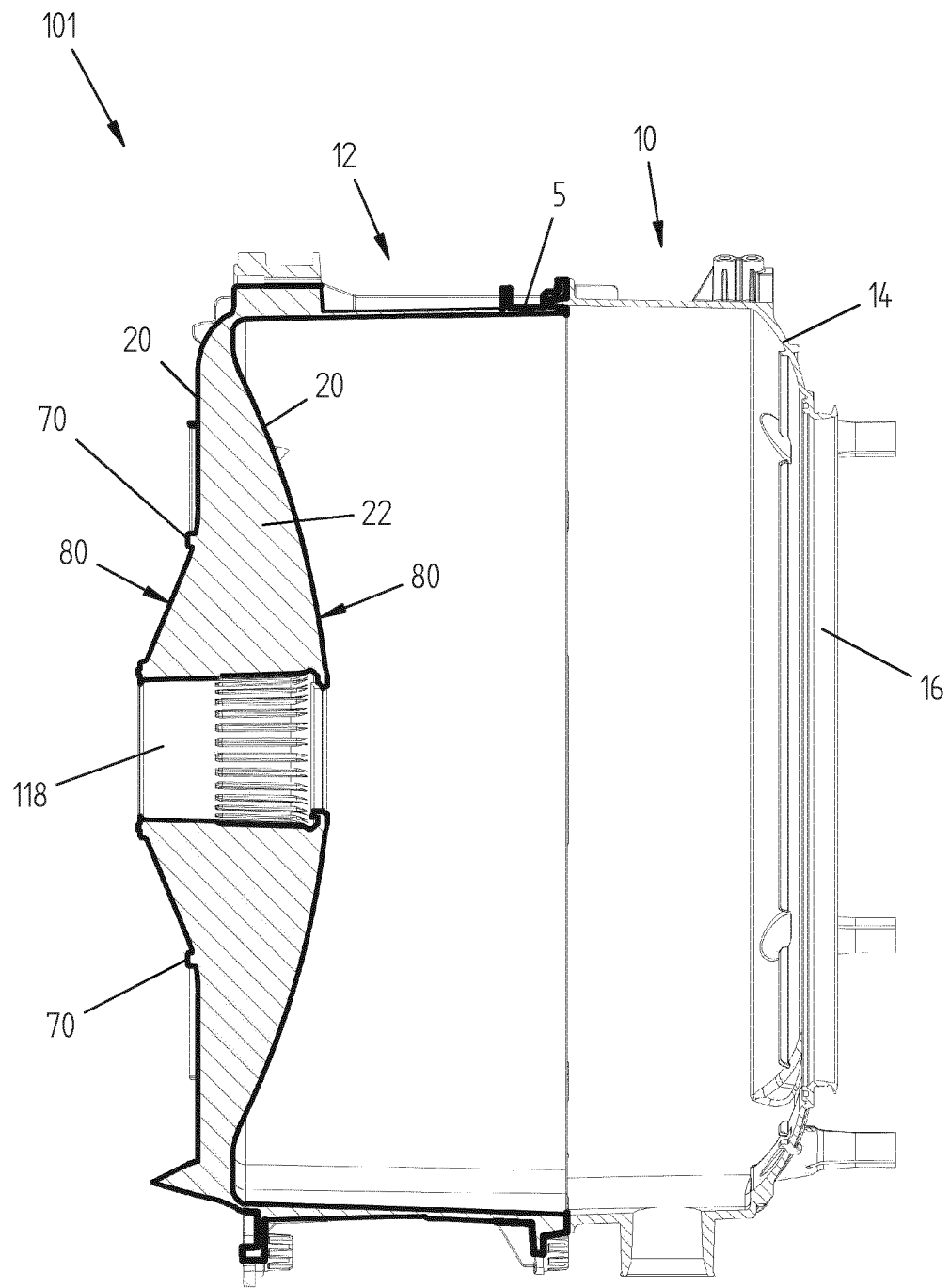
FIG. 10 is a cross section along line X°-X° of FIG. 8.

With reference to FIGS. 8 to 10 a further preferred embodiment of a washing tub 101 according to the invention is shown. In the drawings, corresponding characteristics and/or components compared to first preferred embodiment are identified by the same reference numbers.

The washing tub 101 has a substantially cylindrical-shaped tubular body 5.

The washing tub 101 preferably comprises a first hemi-shell 10, or front hemi-shell 10, and a second hemi-shell 12, or rear hemi-shell 12, structured for being reciprocally coupled to form the washing tub 101.

The front hemi-shell 10 of the washing tub 101 preferably comprises a front wall 14 provided with a front mouth 16.

The rear hemi-shell 12 of the washing tub 101 preferably comprises a rear wall 18.

The rear wall 18 preferably comprises a mounting hole 118 for a driving shaft (not shown).

According to the invention, as described above, the washing tub 101 preferably comprises a first polymeric material 20 and a second polymeric material 22.

The first polymeric material 20 constitutes the external surface 80 of the washing tub 101 and completely covers the second polymeric material 22.

The second polymeric material 22 constitutes the core of the washing tub 101 and is completely surrounded by the first polymeric material 20.

In FIG. 10, first and second polymeric materials 20, 22 are depicted only for rear hemi-shell 12 for clarity's sake. It has to be noted that the same applies to the front hemi-shell 10.

The component 101 is preferably obtained through a continuous injection moulding process as described above with reference to the first embodiment.

Preferably, a moulding injection process is used to obtain the rear hemi-shell 12 and a moulding injection process is used to obtain the front hemi-shell 10.

A proper shaped mould is used to obtain the rear hemi-shell 12 of the washing tub 101.

The mould preferably comprises four injection point/channels through which molten polymeric material is forced into the mould cavity. The four injection points/channels are preferably opportunely arranged to allow the more uniform distribution of the molten polymeric material inside the mould. The injection points are preferably arranged in the mould to define corresponding four injection points 70 at the rear hemi-shell 12 around the mounting hole 118, as visible on FIG. 8.

It has to be noted that the front hemi-shell 10 and the rear hemi-shell 12 are preferably coupled to form the washing tub 101 by means of screws. At this purpose, front hemi-shell 10 and rear hemi-shell 12 are preferably provided with holes apt to receive the screws. Holes may be realized after the moulding process, so that the core of the washing tub 1 may be locally not covered by the first polymeric material 20 of the external surface 80, thus exposing the core of the washing tub 1 to the external ambient. Nevertheless, holes are subsequently advantageously covered by the assembly of the screws.

It has thus been shown that the present invention allows all the set objects to be achieved. In particular, it makes it possible to optimize mechanics and/or aesthetics characteristics of plastic components on the base of the type of plastic material used in the producing process.

While the present invention has been described with reference to the particular embodiment shown in the figures, it should be noted that the present invention is not limited to the specific embodiment illustrated and described herein; on the contrary, further variants of the embodiment described herein fall within the scope of the present invention, which is defined in the claims.

The invention claimed is:

1. A component for a water bearing appliance, the component comprising:
   a first polymeric material; and
   a second polymeric material;
   wherein:
   the first polymeric material constitutes the external surface of the component and completely covers the second polymeric material, wherein the first polymeric material and the second polymeric material have different characteristics; and
   wherein the second polymeric material comprises recycled polymeric material derived from polyolefin polymers, the recycled polymeric material comprising one or more of the following chemical elements: Lead; Cadmium; Hexavalent Chromium; Bromine; Antimony; and Arsenic; and wherein the one or more chemical elements comprises Lead in an amount of 7 ppm to 60 ppm;
   the one or more chemical elements comprises Cadmium in an amount of 5 ppm to 20 ppm;
   the one or more chemical elements comprises Bromine in an amount of 5 ppm to 60 ppm;
   the one or more chemical elements comprises Antimony in an amount of 5 ppm to 50 ppm; and/or
   the one or more chemical elements comprises Arsenic in an amount of 5 ppm to 50 ppm, and
   wherein the water bearing appliance is a laundry washing machine or a dishwasher.

2. The component according to claim 1, wherein the first polymeric material and/or the second polymeric material comprises a thermoplastic material.

3. The component according to claim 1, wherein the first polymeric material and the second polymeric material are different in terms of degree of purity and/or mechanical strength and/or chemical composition.

4. The component according to claim 1, wherein the first polymeric material does not comprise a recycled polymeric material.

5. The component according to claim 1, wherein the recycled material derives from post-consumer plastic and/or post-industrial plastic materials.

6. The component according to claim 1, wherein the first polymeric material and the second polymeric material form a one-piece monolithic body.

7. The component according to claim 1, wherein the first polymeric material and the second polymeric material are co-injected material resulting from co-injection molding process.

8. The component according to claim 1, wherein the component is one of: a tub of the water bearing appliance, a casing component of the water bearing appliance, and a control panel of the water bearing appliance.

9. The component according to claim 1, wherein the component is a tub of the laundry washing machine, the tub comprising a front hemi-shell and a rear hemi-shell, wherein an external surface of the front hemi-shell and/or of the rear hemi-shell is completely covered by the first polymeric material.

10. A component for a water bearing appliance, the component comprising:
    an external surface formed from a first polymeric material having a first set of characteristics; and
    a core formed from a second polymeric material having a second set of characteristics different from the first set of characteristics, and wherein the second polymeric material comprises recycled polymeric material, the recycled polymeric material comprising at least one of: Lead in an amount of 7 ppm to 60 ppm, Hexavalent Chromium in an amount of 10 ppm to 100 ppm, Bromine in an amount of 5 ppm to 100 ppm, Antimony in an amount of 5 ppm to 200 ppm, or Arsenic in an amount of 5 ppm to 200 ppm, and
    wherein the water bearing appliance is a laundry washing machine or a dishwasher.

11. The component of claim 10, wherein the first polymeric material completely covers the second polymeric material.

12. The component of claim 10, wherein the first polymeric material and/or the second polymeric material comprises a thermoplastic material.

13. The component of claim 10, wherein the first set of characteristics comprises a first degree of purity, a first mechanical strength, and a first chemical composition and the second set of characteristics comprises a second degree of purity, a second mechanical strength, and a second chemical composition.

14. The component of claim 13, wherein the first degree of purity differs from the second degree of purity.

15. The component of claim 13, wherein the first mechanical strength differs from the second mechanical strength.

16. The component of claim 13, wherein the first chemical composition differs from the second chemical composition.

17. A component for a water bearing appliance, the component comprising:
    a core comprising a recyclable polymeric material, wherein the recyclable polymeric material is derived from polyolefin polymers and the recyclable polymeric material comprises at least one chemical element selected from the group consisting of Lead in an amount of 7 ppm to 60 ppm, Hexavalent Chromium in an amount of 10 ppm to 100 ppm, Bromine in an amount of 5 ppm to 100 ppm, Antimony in an amount of 5 ppm to 500 ppm, and Arsenic in an amount of 5 ppm to 200 ppm; and
    an external surface disposed about the core and comprising a non-recyclable polymeric material, and
    wherein the water bearing appliance is a laundry washing machine or a dishwasher.

18. The component of claim 17, wherein the at least one chemical element is present in an amount of no more than 20 ppm Hexavalent Chromium, 60 ppm Bromine, 50 ppm Antimony, and/or 50 ppm Arsenic.

* * * * *